(12) United States Patent
Monti

(10) Patent No.: US 10,195,478 B2
(45) Date of Patent: Feb. 5, 2019

(54) EXERCISE APPARATUS

(71) Applicant: Jonathan Monti, Newport, RI (US)

(72) Inventor: Jonathan Monti, Newport, RI (US)

( * ) Notice: Subject to any disclaimer, the term of this patent is extended or adjusted under 35 U.S.C. 154(b) by 0 days.

(21) Appl. No.: 15/266,589

(22) Filed: Sep. 15, 2016

(65) Prior Publication Data
US 2017/0100627 A1    Apr. 13, 2017

Related U.S. Application Data

(60) Provisional application No. 62/218,872, filed on Sep. 15, 2015.

(51) Int. Cl.
| | | |
|---|---|---|
| A63B 21/00 | (2006.01) | |
| A63B 21/02 | (2006.01) | |
| A63B 21/04 | (2006.01) | |
| A63B 23/02 | (2006.01) | |
| A63B 23/12 | (2006.01) | |
| A63B 21/068 | (2006.01) | |
| A63B 69/00 | (2006.01) | |

(Continued)

(52) U.S. Cl.
CPC .... *A63B 21/4029* (2015.10); *A63B 21/00058* (2013.01); *A63B 21/023* (2013.01); *A63B 21/04* (2013.01); *A63B 21/068* (2013.01); *A63B 21/4033* (2015.10); *A63B 21/4034* (2015.10); *A63B 21/4035* (2015.10); *A63B 21/4047* (2015.10); *A63B 23/0205* (2013.01); *A63B 23/0211* (2013.01); *A63B 23/1236* (2013.01); *A63B 21/00069* (2013.01); *A63B 21/00076* (2013.01); *A63B 21/0085* (2013.01); *A63B 21/00181* (2013.01); *A63B 21/0552* (2013.01); *A63B 21/4001* (2015.10); *A63B 23/0216* (2013.01); *A63B 69/0057* (2013.01); *A63B 2208/0247* (2013.01); *A63B 2208/0295* (2013.01); *A63B 2210/50* (2013.01); *A63B 2225/09* (2013.01); *A63B 2225/093* (2013.01); *F16B 7/10* (2013.01)

(58) Field of Classification Search
CPC . A63B 21/00058; A63B 21/04; A63B 21/023; A63B 21/4029; A63B 21/4034; A63B 21/4035; A63B 23/1236; A63B 23/0205; A63B 2205/09
See application file for complete search history.

(56) References Cited

U.S. PATENT DOCUMENTS

| | | | | |
|---|---|---|---|---|
| 5,545,114 A | * | 8/1996 | Gvoich | A63B 21/055 482/123 |
| 5,833,590 A | * | 11/1998 | Chiu | A63B 21/0552 482/112 |

(Continued)

*Primary Examiner* — Megan Anderson
(74) *Attorney, Agent, or Firm* — Bay State IP, LLC

(57) ABSTRACT

The present invention relates to exercise equipment, particularly for improved strength training exercises. More particularly, the invention relates to equipment that allows the user to vary tension when performing different exercises. The present invention is specifically designed for improved exercise through the variability of a tension component for use in such exercises as the plank exercise, sit-ups, push-ups and supine pull-ups that includes a bench area, a guide arm, a head area, and a foot area that work in conjunction to most optimally support the user. The bench area, the head area and the foot area are all connected, supported, and elevated from the floor by a base.

16 Claims, 8 Drawing Sheets

(51) Int. Cl.
  *A63B 21/008*  (2006.01)
  *A63B 21/055*  (2006.01)
  *F16B 7/10*  (2006.01)

(56) References Cited

U.S. PATENT DOCUMENTS

| | | | | |
|---|---|---|---|---|
| 6,113,522 | A * | 9/2000 | Fontenot | A63B 21/012 |
| | | | | 482/111 |
| 6,398,699 | B1 * | 6/2002 | Yang | A63B 22/14 |
| | | | | 482/142 |
| 6,932,749 | B2 * | 8/2005 | Barnes | A63B 21/00072 |
| | | | | 482/130 |
| 8,016,731 | B2 * | 9/2011 | Vanterpool | A63B 21/068 |
| | | | | 482/133 |
| 2002/0123414 | A1 * | 9/2002 | Chen | A63B 21/023 |
| | | | | 482/123 |
| 2008/0242519 | A1 * | 10/2008 | Parmater | A63B 22/0076 |
| | | | | 482/72 |

* cited by examiner

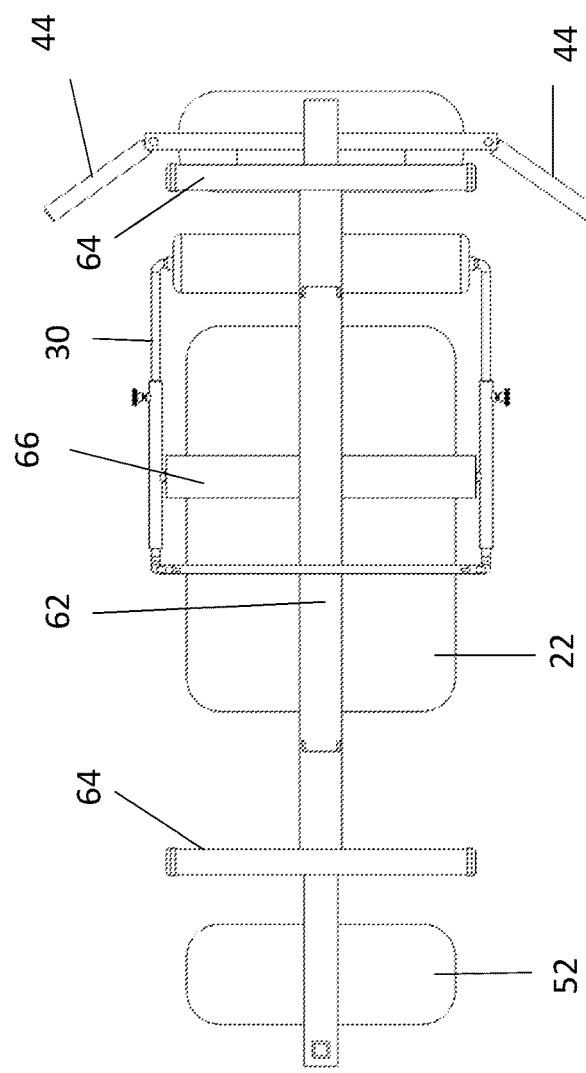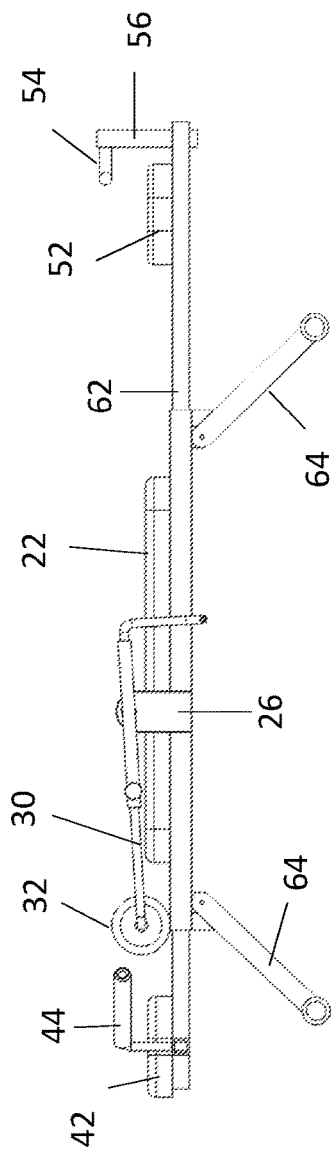
Fig. 4
Fig. 5

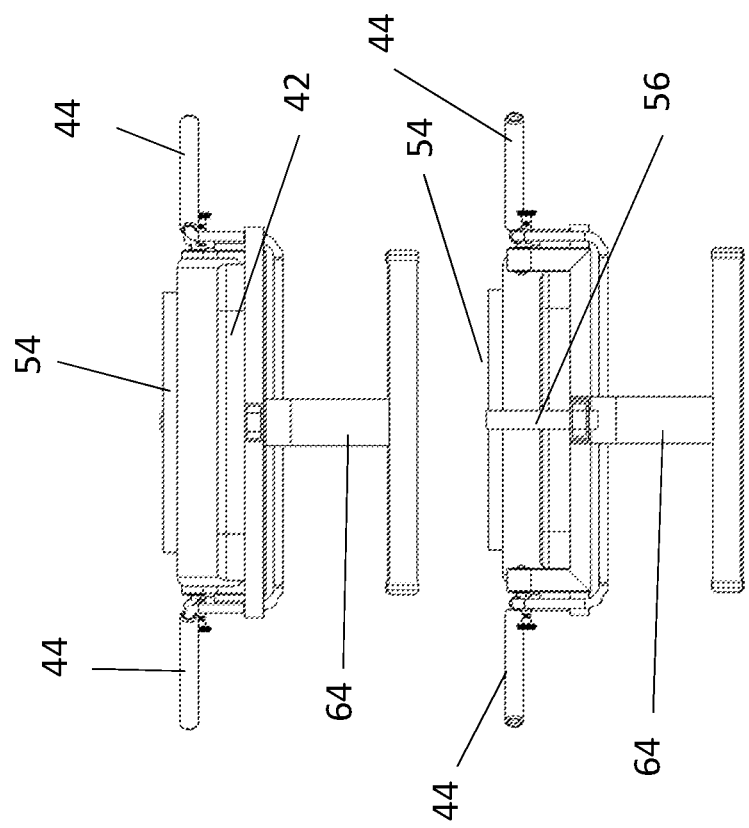

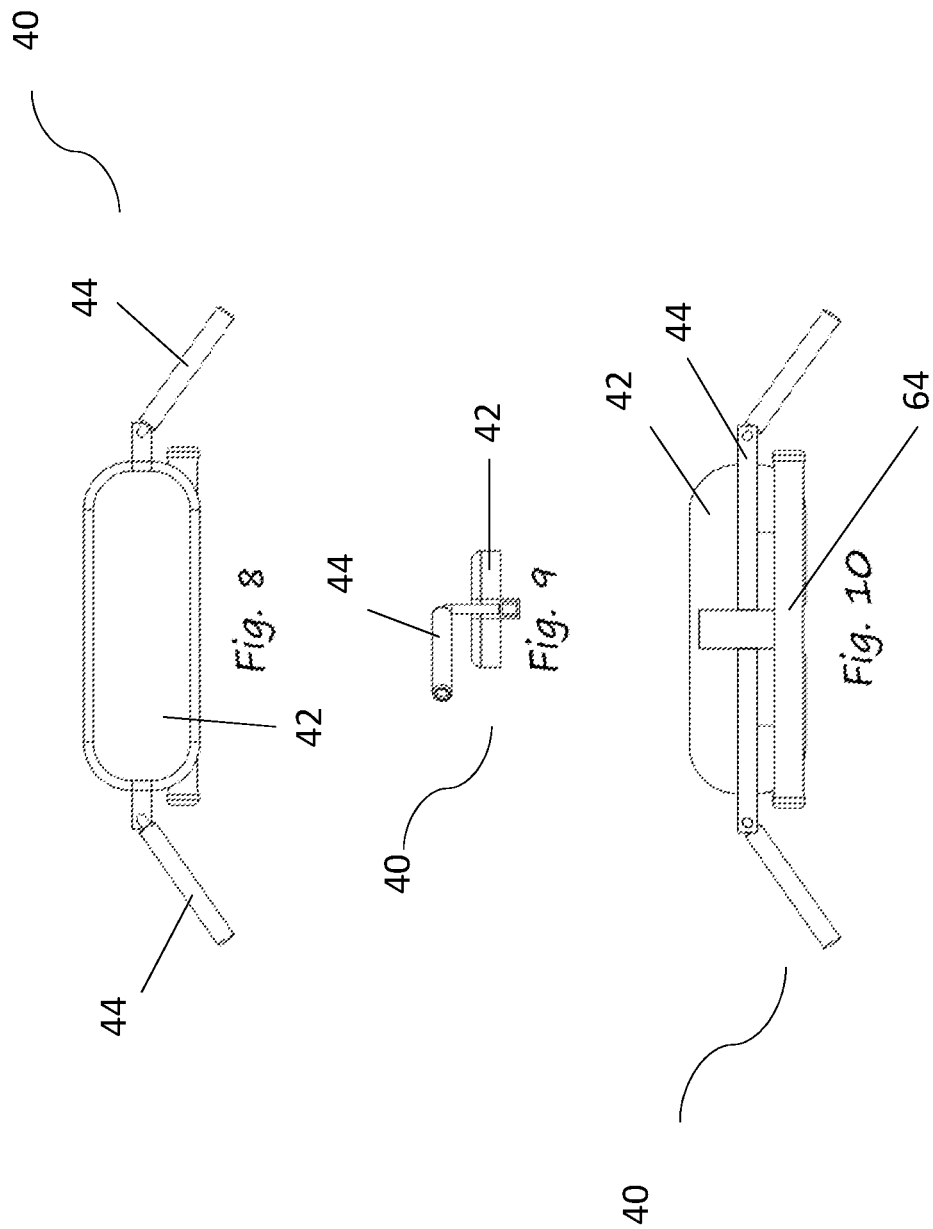

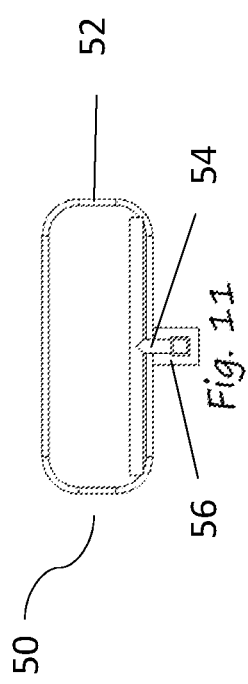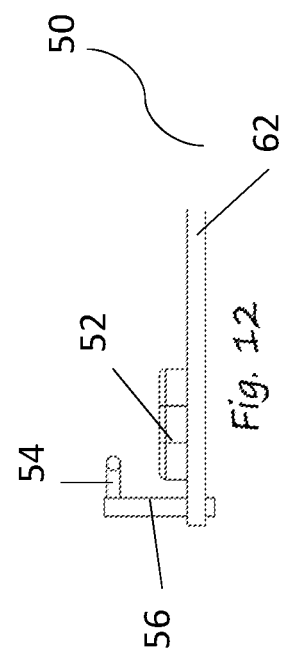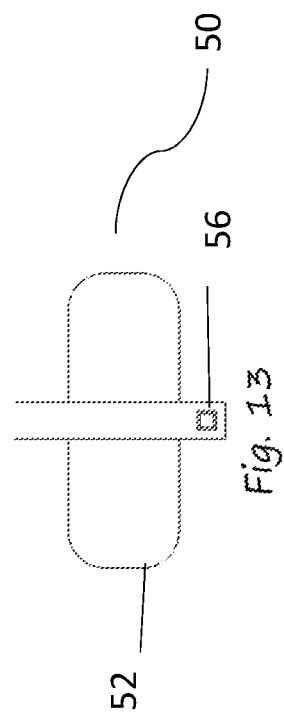

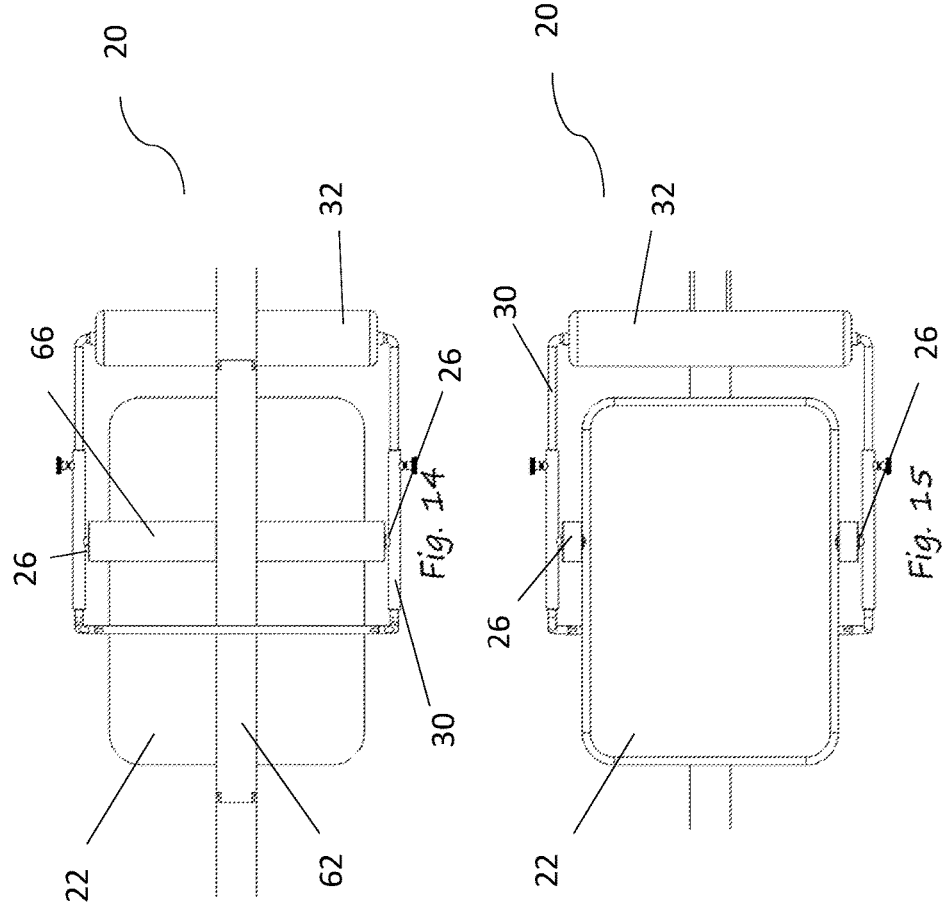

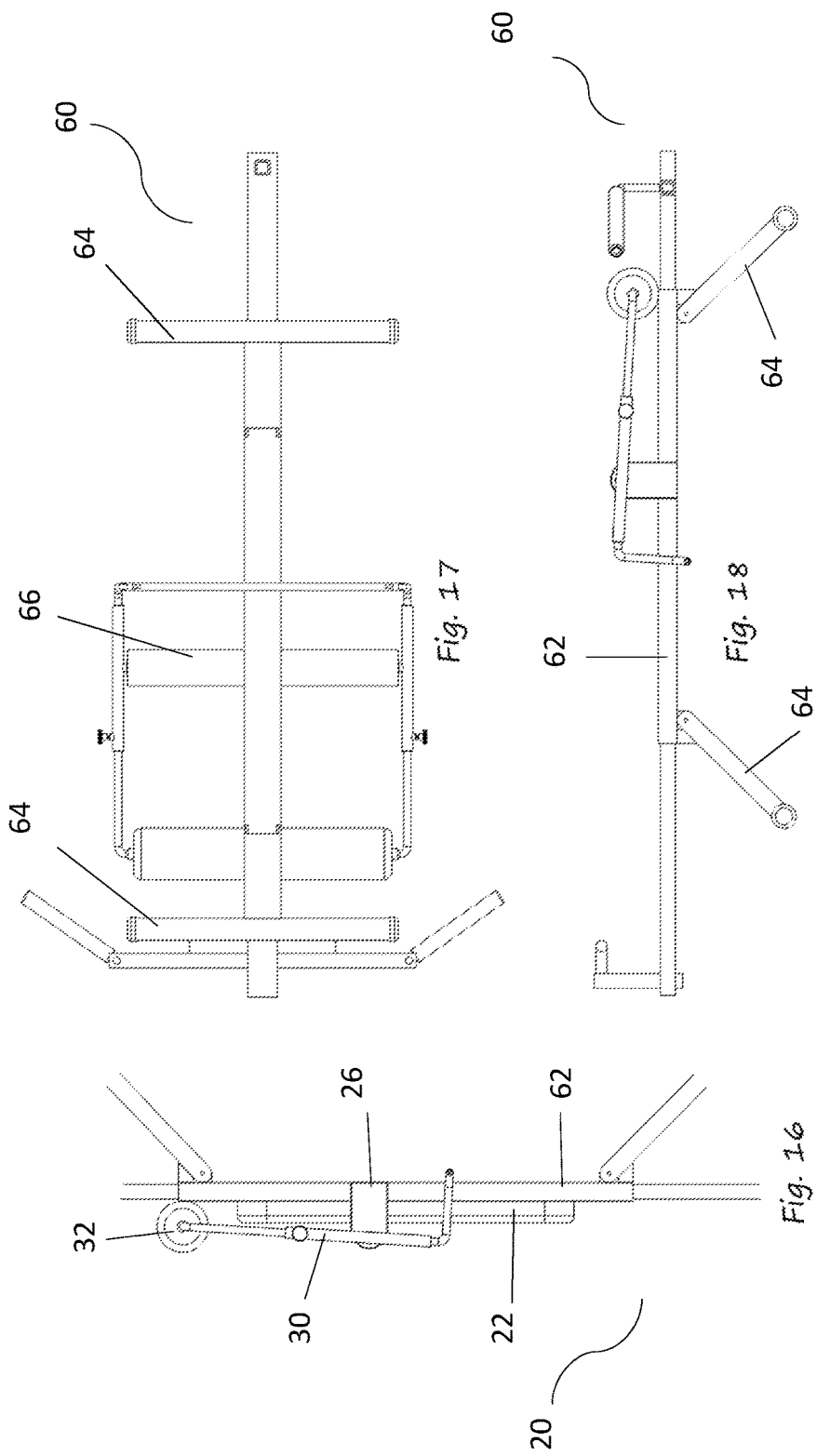

EXERCISE APPARATUS

CROSS REFERENCE TO RELATED APPLICATION

This application claims the benefit of and takes priority from U.S. Provisional Patent Application No. 62/218,872 filed on Sep. 15, 2015, the contents of which are herein incorporated by reference.

BACKGROUND OF THE INVENTION

The present invention relates to exercise equipment, particularly for improved strength training exercises. More particularly, the invention relates to equipment that allows the user to vary tension when performing different exercises.

STATE OF THE ART

Many types of exercise equipment exist and are used for maintaining a healthy lifestyle, getting back into shape, rehabilitation and various other physical fitness purposes. Some of the existing equipment attempts to limit the strain on the body of the user in performing certain exercises. While certain existing equipment does improve the user's ability to perform certain exercises, there exists a need for further improvement to increase support to the user while simultaneously allowing the user to perform certain exercises in a more efficient and effective way with less strain on their body and increased stability. Further, there exists a need for a machine that allows the user to adjust the provided tension in the machine with greater ease but still provide varied tension levels for different user ability level as well as allowing for a choice of difficulty level.

SUMMARY OF THE INVENTION

It is therefore an object of the present invention to provide exercise equipment that is specifically designed for improved exercise through the variability of a tension component for use in such exercises as a plank, sit-ups and push-ups that includes a bench area, a guide arm, a head area, a foot area and a base. The bench area comprises a body support pad and is attached to the guide arm at a fulcrum and through a force component. At one end of the bench area, the bench area is attached to the head area which comprises a safety pad and at least two handlebars. At the opposite end, the bench area is attached to the foot area which comprises of a foot pad, a T-bar, and a T-bar positioner. The bench area, the head area and the foot area are all connected to and supported by the base.

It is an object that the invention stores energy to counterbalance the user during certain static exercises, such as the plank exercise.

It is an object that the placement of the safety pad provides improved support to the user during certain static exercises.

It is an object that the T-bar contributes to the user's ability to do improved closed chain exercises by providing additional support and stability, fortifying the user's safety while performing the exercises.

It is an object of the invention that the combination of the placement of the safety pad and T-bar assists the user in maintaining the correct posture for certain exercises.

It is an object of the invention that the placement of the fulcrum is ideal for closed chain exercises, specifically plank, sit-ups, and push-up exercises.

It is an object of the invention that the guide arm assists the user in maintaining proper positioning while performing certain exercises, such as preventing the user's back to sag during a plank exercise.

It is an object that minor adjustments to the force component will be sufficient to provide the user various levels of resistance or counterbalance, depending on the type of exercise the user is doing.

It is an object of the invention that the raised position of the bench area relative to the floor allows the user to improve the level and benefits of certain exercises by providing the user the ability to incorporate a greater range of motion during the exercise.

It is an object of the invention that the raised position of the bench area relative to the floor allows the user to activate additional muscle groups when performing certain exercises.

It is an object of the invention that the guide arm may positioned in different positions depending on the user's choice of exercise.

It is an object of the invention that the equipment is foldable to be more easily stored and carried.

Other advantages and novel features of the present invention are more apparent in the following detailed description of the invention when considered in conjunctions with the accompanying drawings.

BRIEF DESCRIPTION OF THE DRAWINGS

FIG. 4 is a bottom plan view of the exercise equipment;
FIG. 5 is a back side plan view of the exercise equipment;
FIG. 6 is a right plan view of the exercise equipment;
FIG. 7 is a left plan view of the exercise equipment;
FIG. 8 is a partial top plan view of the head area;
FIG. 9 is a partial front side plan view of the head area;
FIG. 10 is a partial bottom plan view of the head area;
FIG. 11 is a partial top plan view of the foot area;
FIG. 12 is a partial front side plan view of the foot area;
FIG. 13 is a partial bottom plan view of the foot area;
FIG. 14 is a partial bottom plan view of the bench area;
FIG. 15 is a partial top plan view of the bench area;
FIG. 16 is a partial front side plan view of the bench area;
FIG. 17 is a bottom plan view of the base;
and
FIG. 18 is a back plan view of the base.

DESCRIPTION OF THE PREFERRED EMBODIMENTS

Figure 1:
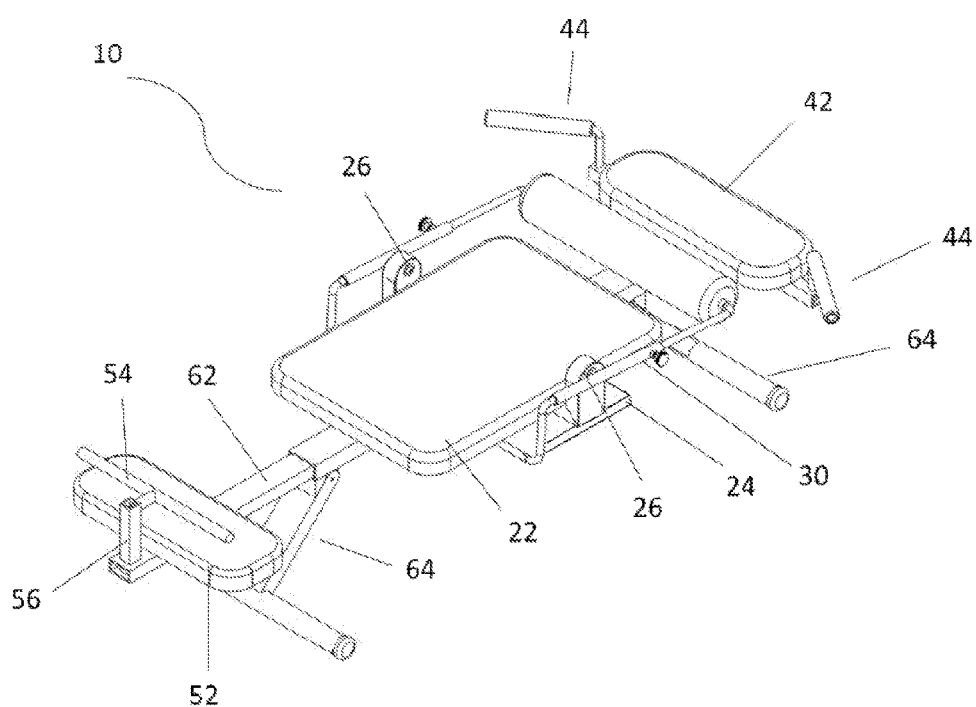
FIG. 1 is a perspective view of exercise equipment.
Figure 2:
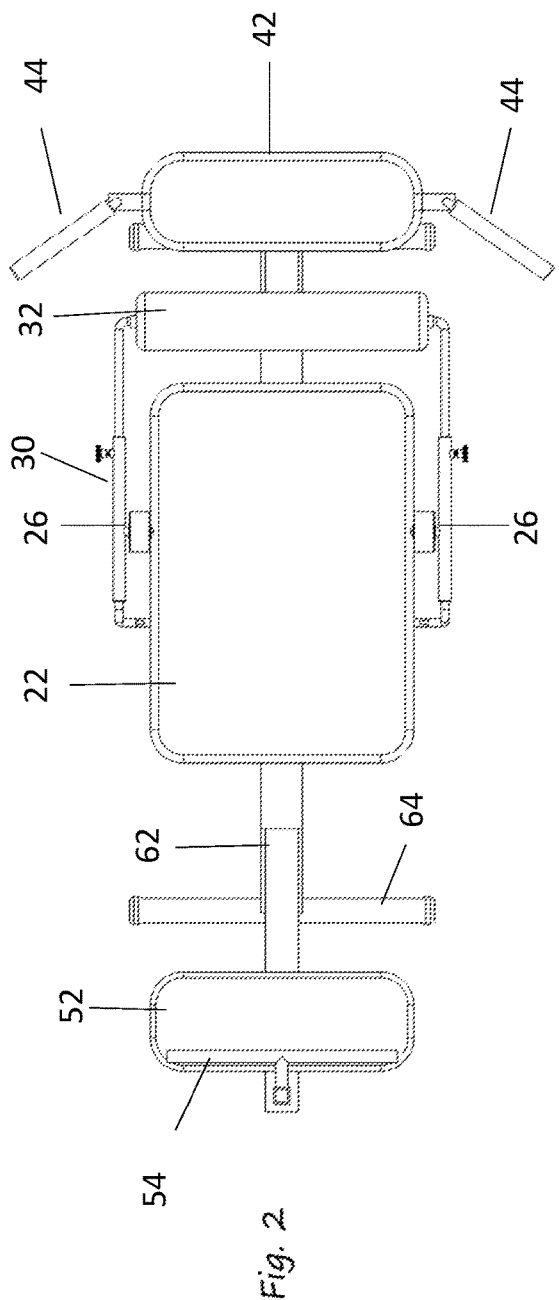
FIG. 2 is a top plan view of the exercise equipment.

FIG. 1 is a perspective view of exercise equipment 10. The exercise equipment 10 is comprised of three main areas: a bench area 20, head area 40 and foot area 50, and a base 60 which supports the three main areas (20, 40, 50). The head area 40, more closely depicted in FIGS. 8-10, consists of a safety pad 42 and handlebars 44. The position of the handlebars 44 may be adjusted by the user depending on the type of exercise desired. The foot area 50, more closely depicted in FIGS. 11-13, consists of a foot pad 52, a T-bar 54, and a T-bar positioner 56.

The bench area 20, more closely depicted in FIGS. 14-16, consists of a body support pad 22, a guide arm 30, and a guide arm pad 32. The guide arm 30 is connected to the bench area 20 by at least one fulcrum 26 that allows the guide arm 30 to move with the user. The guide arm 30 is also connected to a force component 24 that can be varied and adjusted according to the user.

Figure 3:
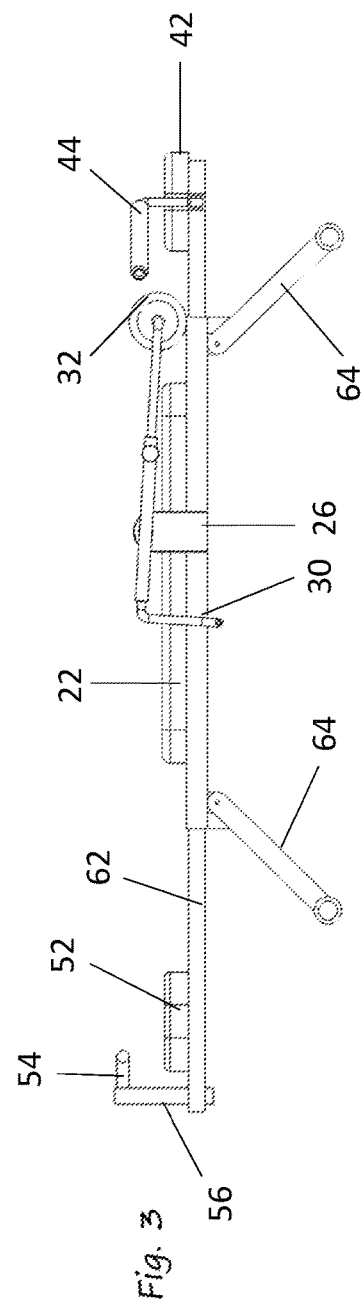
FIG. 3 is a front side plan view of the exercise equipment.

As seen in FIG. 4, a main support beam 62 runs the length of the machine and connects the three main areas (20, 40, 50) of the exercise equipment 10. FIG. 14 shows the bench area 20 is provided additional support by at least one bench area support beam 66 that runs perpendicularly to the main support beam 62 and is underneath the body support pad 22. Further, it can be seen in FIGS. 3 and 5 that the three main areas (20, 40, 50) of the exercise equipment 10 are elevated from floor level by the legs 64.

Operation of the Preferred Embodiment

The three main areas (20, 40, 50) provide user support in performing certain exercises. The body support pad 22 in conjunction with the foot pad 52 and safety pad 42 support the user's body while doing certain closed circuit exercises with the exercise equipment 10. The guide arm 30 and guide arm pad 32 provide the user with greater stability and ensures proper posture while doing certain exercises. Further the guide arm 30 provides additional resistance and counterbalances the user and may be positioned in either an up position or a down position. In an alternate embodiment of the invention, there may be an additional harness component to allow the use to stay connected to the machine during certain exercises, such as sit-ups or supine pull-ups, to provide user support and counterbalancing aspects. In yet another embodiment, the invention may include additional and auxiliary user supports and allow for adjustable positioning of the guide arm 30 to match adjustments of the auxiliary supports.

The force component 24 may be made of any device known to one skilled in the art such as elastic cords, coil springs (extension or compression), and gas springs, that is mechanically connected to both the guide arm and bench area. Minor adjustments to the force component allow for large changes in the tension experienced by the user. Adjusting the force component 24 changes the angle position of the guide arm 30. In an alternate embodiment of the invention, the force component 24 is connected to the guide arm 30 and an alternate location outside the bench area 20. The force component 24 produces force relative to the size of the user. In yet another alternate embodiment of the invention, the exercise equipment 10 is pneumatically powered and the force component is able to be changed while in operation. In an alternate embodiment of the invention, the force component and guide arm position are adjusted with a crank mechanism. In still another embodiment of the invention, there is no force component.

The position and shape of the safety pad 42 provides superior support to the user in performing certain exercises, such as the plank exercise. The handlebars 44 are capable of being adjusted to a variety of positions, both rotationally to adjust the position of the user's hand and by telescoping in and out of the head area 40 to adjust the width of the user's grip, in order for the user to most optimally perform certain exercises, such as the push-up exercise, as well as adjust the level of difficulty for the user. In an alternate embodiment of the invention, the handlebars 44 may be locked into position with screw locks.

The foot area 50 particularly provides stability for the user while performing closed circuit exercises. The position of the T-bar 54 ensures proper foot placement of the user in certain exercises, such as the sit-up exercise. In an alternate embodiment of the invention, the foot pad 52 and/or the T-bar 54 may have resistive surfaces. In another embodiment of the invention, the T-bar 52 may be positioned at different heights. In still another embodiment of the invention, more than one T-bars may exist at varying heights. In yet another alternate embodiment of the invention, additional foot supports, that do not extend towards the user, may be placed above the T-bar. In an alternate embodiment of the invention, the T-bar 54 and T-bar positioner may be folded down for lower profile storage.

Other embodiments of the invention may include variations on stability in the head area 40 and foot area 50.

The exercise equipment 10 is also foldable, providing the user convenience in storing and transporting it. In an alternate embodiment of the invention, it is capable of folding multiple times for lower profile storing. Other embodiments may include lighter weight materials to even further improve the user's ease of transporting it.

The foregoing descriptions of specific embodiments of the present invention are presented for purposes of illustration and description. They are neither intended to be exhaustive nor to limit the invention to the precise forms disclosed, and obviously, many modifications and variations are possible in light of the above teaching. The embodiments were chosen and described in order to best explain the principles of the invention and its practical application, to thereby enable others skilled in the art to best utilize the invention and its various embodiments with various modifications as are suited to the particular use contemplated. It is, of course, not possible to describe every conceivable combination of components or methodologies for purposes of describing the claimed subject matter, but one of ordinary skill in the art may recognize that many further combinations and permutations of the claimed subject matter are possible. It is intended that the scope of the invention be defined most broadly by the specifications and the figures appended hereto and their equivalents. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An exercise device comprising:
   a user support area consisting of
      a bench area;
      a head area; and
      a foot area elevated from a floor;
   a base structure fixedly connected to the user support area;
   wherein the bench area consists of a main support pad, a guide arm member, a guide arm pad, and a force component.

2. The exercise device of claim 1 wherein the foot area consists of a foot pad, a T-bar and a T-bar positioner.

3. The exercise device of claim 2 wherein the T-bar and the T-bar positioner are fixedly attached to each other.

4. The exercise device of claim 2 wherein the T-bar positioner is fixedly attached to the base structure.

5. The exercise device of claim 2 wherein the T-bar is positioned to provide support to a user.

6. The exercise device of claim 2 wherein the T-bar is capable of being telescopically adjusted.

7. The exercise device of claim 1 wherein the head area consists of a safety pad and two handlebars.

8. The exercise device of claim 7 wherein the safety pad is positioned to provide support to a user.

9. The exercise device of claim 7 wherein the two handlebars are capable of being adjusted rotationally.

10. The exercise device of claim 7 wherein the two handlebars are capable of being adjusted telescopically in and out of the head area.

11. The exercise device of claim 1 wherein the force component is connected to the guide arm member and the base structure.

12. The exercise device of claim 11 wherein the guide arm member consists of a user end positioned above the bench area that is covered with the guide arm pad.

13. The exercise device of claim 1 wherein the guide arm member is pivotally connected to the main support pad.

14. The exercise device of claim 1 wherein the force component is elastic.

15. The exercise device of claim 1 wherein the force component is a coil spring.

16. The exercise device of claim 1 wherein the force component is a gas spring.

* * * * *